Patented Nov. 4, 1930

1,780,323

UNITED STATES PATENT OFFICE

WILLIAM GEORGE WARING, OF WEBB CITY, MISSOURI

UTILIZATION OF GALVANIZER'S WASTE

No Drawing.  Application filed July 6, 1929.  Serial No. 376,503.

This invention relates to the utilization of galvanizers' waste; and it comprises a methodical succession of steps applied to such waste to obtain products of commercial value.

Considerable quantities of waste material, known variously as galvanizers' waste, "sal skimmings", "dry skimmings", "zinc ashes", etc. are produced in this country. The material is of exceedingly varying composition but it always contains zinc, iron and more or less organic matter. Some portion of it is dross, which is a zinc iron alloy, sometimes carrying 4 per cent iron and other metals. All sorts of materials gain access to the galvanizing pots with the zinc and iron and are represented in the galvanizers' waste. Ammonium chlorid and zinc chlorid are always contained. In the art, one way of handling this material is to work it up in a ball mill with hot water. Undissolved dross and metallic zinc particles are screened off and distilled with carbon to regain spelter. The aqueous solution formed is treated with bleaching powder to oxidize and precipitate iron and the solution is then evaporated to give soldering salts. As it contains both ammonium chlorid and zinc chlorid, good soldering salt may be obtained. Pure zinc chlorid may be obtained from it.

In the present process I also initially treat the galvanizers' waste in a ball mill and then screen to obtain a watery sludge or slurry and a metallic residue which latter may be distilled for its zinc content. But I treat the slurry in a different way to secure a methodical utilization of its various contained valuables.

In the present invention, the sludge, or slurry, or solution remaining after the screening to regain metal is discharged directly into an ammonia still. This still may be of cast iron and may be any of the usual types of continuous still. With the sludge I also charge a certain amount of milk or cream of lime, or burnt magnesia; the amount being sufficient to react with all sulfates and chlorids present and to flocculate colloidal matter (silicates, tarry and oily matter, etc.) The neutralized mixture in the still is then subjected to distillation by means of superheated steam until all ammonia present is sent over. The hot neutral liquid is then aerated by bubbling air through it until all ferrous salts are converted into and precipitated as ferric compounds. The temperature may drop somewhat below the boiling point in this aerating stage. After aeration, all the heavy metal values are in the insoluble precipitate and the liquid, which is a solution of calcium and magnesium chlorids and sulfates may be discarded. The liquid contents of the still are separated by sedimentation and decantation or by filterpressing and the residue washed till free of chlorin.

The pressed cake or washed precipitate contains zinc and, usually, some cadmium and lead. It is charged into digesters and extracted with ammonium carbonate solutions; the digestion being under a pressure somewhat less than atmospheric to avoid loss of ammonia and to obtain certain advantages. Digestion processes of this type are described and claimed in the copending application of Waring & Waring, Serial No. 312,357, October 13, 1928, to which reference is here made.

Extraction with ammonium carbonate takes the zinc and the cadmium into solution, leaving lead carbonate and ferric oxid undissolved. The dissolved cadmium is however present in the solution in an unstable form and unless the liquid is removed with reasonable promptness, some or all of the cadmium may come out of solution again, joining the undissolved lead carbonate. If this redeposition of cadmium carbonate is wanted, it can be accelerated by seeding the digester liquor with preformed crystalline cadmium carbonate. Ordinarily however I regard it as better practice to let the cadmium go forward with the zinc as I can obtain a simpler separation. If the cadmium is present in any substantial amount it is possible to obtain it as crystallized carbonate by seeding the clear liquor separated from the lead carbonate with crystals of cadmium carbonate.

In digesting the pressed cake with ammonium carbonate solution I operate in the cold; usually somewhere between 50 and 80° F. It is advantageous to use a suction equivalent to half an inch or so of mercury. A digestion of about 30 minutes under agitation is usually sufficient.

The ammonium carbonate solution, removed from the undissolved residue, may be filtered if necessary and contains zinc and, often, some cadmium. It is treated with metallic zinc to throw out the cadmium. With the cadmium may be precipitated many other metals, such as copper, occurring in the waste in small amounts. Arsenic is not often present but when it occurs it is removed in this operation as gaseous hydrid (arsine). The escaping hydrogen may be burnt to convert the arsine into the less dangerous arsenous oxid; or special measures may be taken to collect the arsine, as circumstances may dictate. The "pregnant liquor" is next distilled to evolve ammonia and $CO_2$, which are collected for reuse, and to precipitate zinc carbonate. In a plant of any size, it is useful to economize heat in this operation by exchanging heat between the liquids going to and those coming from the still. The zinc carbonate obtained is pure and may be used for any purpose for which it is adapted.

Returning to the insoluble matter left in the ammonium carbonate digestion, this contains ferric oxid and hydrate and lead carbonate. It is methodically washed with water in a countercurrent or other ways which will enable the use of a minimum amount of washing liquors. The washing liquors rejoin the digestion liquor to utilize contained zinc and cadmium. The final wash of the lead carbonate is made with water containing some ammonia. The lead carbonate may be finally extracted from the iron compounds with the aid of dilute acetic acid, giving lead acetate.

In the described method it will be noted that chlorin is completely removed from the system early in the operation. In the presence of any chlorids in the liquids the subsequently described operations do not function as well. Operating as described, the iron is converted into a dense, granular ferric oxid or compound which can be easily handled and washed. Any silica or silicates or other colloidal bodies which may be in the galvanizers' waste are also brought into insoluble readily separable form in the precipitating operation and do not go into solution. The zinc carbonate finally obtained is free of iron and of the gross impurities contained in the original galvanizers' waste. It is saleable per se or it can be used as a raw material for producing zinc of high purity either by distillation or by electrolysis. By heating it can be converted into high grade zinc oxid.

What I claim is:—

1. In the utilization of galvanizers' waste, the process which comprises wet grinding such waste, screening out metallic particles, neutralizing the screened slurry, distilling off ammonia, oxidizing to convert ferrous iron into ferric, filtering the slurry and washing the solids to remove chlorids and extracting the washed solids with ammonium carbonate solution to dissolve and remove zinc while leaving lead compounds undissolved.

2. In the utilization of galvanizers' waste, the process which comprises wet grinding such waste, screening out metallic particles, neutralizing the screened slurry, distilling off ammonia, aerating to convert ferrous iron into ferric, filtering the slurry and washing the solids to remove chlorids and extracting the washed solids with ammonium carbonate solution to dissolve and remove zinc while leaving lead compounds undissolved.

3. In the utilization of galvanizers' waste, the process which comprises wet grinding such waste, screening out metallic particles, neutralizing the screened slurry, distilling off ammonia, aerating to convert ferrous iron into ferric, filtering the slurry and washing the solids to remove chlorids, extracting the washed solids with ammonium carbonate solution to dissolve and remove zinc while leaving lead compounds undissolved, treating the solution with zinc to remove cadmium and other metals and distilling off ammonia compounds to precipitate zinc carbonate.

4. In the utilization of galvanizers' waste, the process which comprises making a slurry from said waste, adding an alkali, distilling off and recovering ammonia, filtering to remove soluble constituents, digesting the residue with ammonium carbonate, recovering zinc as zinc carbonate from the resulting solution and lead as lead acetate from the residue obtained in the digestion step.

5. In the utilization of galvanizers' waste, the process which comprises making a slurry from said waste, adding an alkali, distilling off and recovering ammonia, filtering to remove soluble constituents, digesting the residue with ammonium carbonate, separating the resulting solution of zinc carbonate from the residue, purifying the solution by cementation and recovering zinc as zinc carbonate, and recovering lead as lead acetate from the residue obtained in the digestion step.

In testimony whereof, I have hereunto affixed my signature.

WILLIAM GEORGE WARING.